United States Patent
Tazaki (10) Patent No.: US 6,354,094 B2
(45) Date of Patent: Mar. 12, 2002

(54) REFRIGERATOR OIL COMPOSITION, AND METHOD OF USING THE COMPOSITION FOR LUBRICATION

(75) Inventor: Toshinori Tazaki, Ichihara (JP)

(73) Assignee: Idemitsu Kosan Co., Ltd., Tokyo (JP)

( * ) Notice: Subject to any disclaimer, the term of this patent is extended or adjusted under 35 U.S.C. 154(b) by 0 days.

(21) Appl. No.: 09/859,465

(22) Filed: May 18, 2001

Related U.S. Application Data (62) Division of application No. 09/401,261, filed on Sep. 23, 1999, now Pat. No. 6,263,683.

(30) Foreign Application Priority Data

Dec. 11, 1998 (JP) .............................. 10-353192
Dec. 11, 1998 (JP) .............................. 10-353193

(51) Int. Cl.$^7$ ................................ F25B 41/00
(52) U.S. Cl. ........................................ 62/114
(58) Field of Search .................. 62/114; 252/68

(56) References Cited

U.S. PATENT DOCUMENTS

| | | |
|---|---|---|
| 5,997,760 A | 12/1999 | Schlosberg et al. |
| 6,000,233 A | 12/1999 | Nishida et al. |
| 6,013,609 A | 1/2000 | Katafuchi |

FOREIGN PATENT DOCUMENTS

| | | |
|---|---|---|
| DE | 19719132 A | 12/1998 |
| EP | 0 992 572 A | 12/2000 |
| JP | 10046169 | 2/1998 |
| WO | 98/50499 | 12/1998 |

*Primary Examiner*—William Doerrler
*Assistant Examiner*—Malik N. Drake
(74) *Attorney, Agent, or Firm*—Oblon, Spivak, McClelland, Maier & Neustadt, P.C.

(57) ABSTRACT

Provided is a refrigerator oil composition comprising a refrigerant that comprises carbon dioxide ($CO_2$) as the essential component, and an ester-based lubricating oil composition; wherein the ratio of refrigerant/lubricating oil composition falls between 99/1 and 10/90 by weight. The refrigerator oil composition has good lubricity and sealability and can be stably used for a long period of time in a compression refrigeration cycle in which is used a refrigerant comprising $CO_2$ as the essential component. Also provided is a method of using the composition for lubricating a compression refrigeration cycle equipped with an oil separator and/or a hot gas line.

13 Claims, 1 Drawing Sheet

REFRIGERATOR OIL COMPOSITION, AND METHOD OF USING THE COMPOSITION FOR LUBRICATION

This application is a Div. of Ser. No. 09/401,261 filed Sept. 23, 1999, now U.S. Pat. No. 6,263,683.

BACKGROUND OF THE INVENTION

1. Field of the Invention

The present invention relates to a refrigerator oil composition. More precisely, it relates to a refrigerator oil composition containing a refrigerant that comprises carbon dioxide ($CO_2$) as the essential component, and to a method of using the composition for lubrication especially in a compression refrigeration cycle equipped with an oil separator and/or a hot gas line.

2. Description of the Related Art

In general, a compression refrigeration cycle for refrigerators, for example, that for compression refrigerators comprising a compressor, a condenser, an expansion valve and an evaporator is of a closed system in which is circulated a mixed liquid comprising a refrigerant and a lubricating oil. In compression refrigerators of that type, in general, chlorofluorocarbons such as dichlorodifluoromethane (R-12) and chlorodifluoromethane (R-22) have heretofore been used as refrigerants. Various types of lubricating oils have been produced and used together with such refrigerants. However, when released in air, these Flon compounds that have heretofore been used as refrigerants will bring about environmental pollution, as destroying the ozone layer existing in the stratosphere. Therefore, their use is being severely controlled in all the world. Given the situation, new refrigerants, hydrogen-containing Flon compounds such as hydrofluorocarbons and hydrochlorofluorocarbons have become specifically noted. Hydrogen-containing Flon compounds, especially hydrofluorocarbons such as typically 1,1,1,2-tetrafluoroethane (R-134a) will not destroy the ozone layer. However, as their life in air is long, they will cause global warming. Therefore, the recent tendency in the art is toward using refrigerants from natural resources that are free from the problem.

Above all, carbon dioxide ($CO_2$) is excellent as it is harmless to the environment and is safe to human beings. In addition, it has the advantages of (1) appropriate pressure near to the optimum pressure in economical aspects, (2) extremely small pressure ratio as compared with other conventional refrigerants, (3) good compatibility with ordinary oil and with construction materials for machines, (4) anywhere easy availability, and (5) extremely low costs with no necessity for recovery. However, using such $CO_2$ as a refrigerant is often problematic in that, when it is combined with ordinary refrigerator lubricating oil, the oil composition has poor lubricity and its ability to improve the abrasion resistance of machine parts is poor. As a result, the machine parts being lubricated with the oil composition will become unstable and could not keep long-term durability. In addition, the system in which is used $CO_2$ requires higher jetting pressure, as compared with that where is used R-134a or the like, with the result that the viscosity of the lubricating oil therein is lowered and the sealability of system will be worsened.

SUMMARY OF THE INVENTION

The present invention has been made in consideration of the viewpoints noted above, and its object is to provide a refrigerator oil composition, which exhibits good lubricity and sealability in compression refrigeration cycles where is used a refrigerant comprising $CO_2$ as the essential component, and which can be stably used for a long period of time, and also to provide a method of using the composition for lubrication.

We, the present inventors have assiduously studied and, as a result, have found that the object of the invention can be effectively attained by using a lubricating oil composition comprising a specific lubricating oil base and an additive. On the basis of this finding, the inventors have completed the present invention.

Specifically, the invention provides the following:

1. A refrigerator oil composition comprising a refrigerant that comprises carbon dioxide ($CO_2$) as the essential component, and an ester-based lubricating oil composition; wherein the ratio of refrigerant/lubricating oil composition falls between 99/1 and 10/90 by weight.

2. The refrigerator oil composition of above 1, wherein the ester-based lubricating oil composition comprises a base oil that comprises an ester oil as the essential component and has a kinematic viscosity at 100° C. of from 5.5 to 30 mm$^2$/sec, and from 0.005 to 5% by weight, relative to the base oil, of at least one selected from extreme pressure agents and acid scavengers.

3. A method of using the refrigerator oil composition of above 2 in a compression refrigeration cycle equipped with at least one selected from oil separators and hot gas lines.

4. A method of lubricating a compression refrigeration cycle equipped with at least one selected from oil separators and hot gas lines, for which is used the refrigerator oil composition of above 2.

5. The refrigerator oil composition of above 1, wherein the ester-based lubricating oil composition comprises a base oil that comprises an ester oil as the essential component and has a kinematic viscosity at 40° C. of from 56 to 130 mm$^2$/sec, and wherein the ester oil is of an ester compound of pentaerythritol with at least one selected from C8 and C9 fatty acids.

6. The refrigerator oil composition of above 5, wherein the ester oil is of a carbonate compound.

7. A method of using the refrigerator oil composition of above 5 in a compression refrigeration cycle equipped with at least one selected from oil separators and hot gas lines.

8. A method of lubricating a compression refrigeration cycle equipped with at least one selected from oil separators and hot gas lines, for which is used the refrigerator oil composition of above 5.

9. The refrigerator oil composition of above 5, wherein the fatty acids are in the form of a mixed acid of a branched C8 fatty acid and a branched C9 fatty acid.

10. A method of using the refrigerator oil composition of above 9 in a compression refrigeration cycle equipped with at least one selected from oil separators and hot gas lines.

11. A method of lubricating a compression refrigeration cycle equipped with at least one selected from oil separators and hot gas lines, for which is used the refrigerator oil composition of above 9.

BRIEF DESCRIPTION OF THE DRAWINGS

In those, 1 indicates a compressor; 2 indicates a condenser; 3 indicates an expansion valve; 4 indicates an evaporator; 5 indicates an oil separator; 6 indicates a hot gas line; and 7 indicates a hot gas line valve.

DETAILED DESCRIPTION OF THE INVENTION

The invention is described in detail hereinunder.

The refrigerator oil composition comprises a refrigerant that comprises carbon dioxide ($CO_2$) as the essential component, and an ester-based lubricating oil composition, wherein the ratio of refrigerant/lubricating oil composition falls between 99/1 and 10/90 by weight. The refrigerant for use in the invention comprises $CO_2$ as the essential component, for which $CO_2$ may be directly used or may be mixed with any other refrigerant of, for example, hydrocarbons, fluorohydrocarbons (or chlorofluorohydrocarbons) such as R-134a, and ethers.

The base oil for the lubricating oil composition that constitutes the first embodiment of the invention has a kinematic viscosity of from 5.5 to 30 mm$^2$/sec at 100° C. The kinematic viscosity at 100° C. of the base oil preferably falls between 5.5 and 30 mm$^2$/sec, more preferably between 7.5 to 20.5 mm$^2$/sec, in view of the efficiency and the lubricity of the compressor to which is applied the refrigerator oil composition of the invention.

The base oil comprises an ester oil as the essential component. The ester oil includes (1) polyalcohol esters, (2) aliphatic or aromatic polycarboxylates, (3) alicyclic polycarboxylates, (4) other organic carboxylates, (5) carbonates, (6) fumarate oligomers, (7) hydroxypivalates, and their combinations. These are described hereunder in that order.

(1) Polyalcohol esters:

The polyalcohol esters may be esters of aliphatic polyalcohols with linear or branched fatty acids.

The aliphatic polyalcohols for the esters include ethylene glycol, propylene glycol, butylene glycol, neopentyl glycol, trimethylolethane, ditrimethylolethane, trimethylolpropane, ditrimethylolpropane, glycerin, pentaerythritol, dipentaerythritol, tripentaerythritol, sorbitol, etc.

The fatty acids for them may have from 3 to 12 carbon atoms, preferably including propionic acid, butyric acid, pivalic acid, valeric acid, caproic acid, heptanoic acid, octanoic acid, nonanoic acid, decanoic acid, dodecanoic acid, isovaleric acid, neopentanoic acid, 2-methylbutyric acid, 2-ethylbutyric acid, 2-methylhexanoic acid, 2-ethylhexanoic acid, isooctanoic acid, isononanoic acid, isodecanoic acid, 2, 2-dimethyloctanoic acid, 2-butyloctanoic acid, 3,5,5-trimethylhexanoic acid. Semiesters of aliphatic polyalcohols with linear or branched fatty acids are also usable herein.

As the esters of aliphatic polyalcohols with linear or branched fatty acids, especially preferred are esters of pentaerythritol, dipentaerythritol or tripentaerythritol with any of C5–12 fatty acids, more preferably C5–9 fatty acids, such as valeric acid, hexanoic acid, heptanoic acid, 2-methylhexanoic acid, 2-ethylhexanoic acid, isooctanoic acid, isononanoic acid, isodecanoic acid, 2,2-dimethyloctanoic acid, 2-butyloctanoic acid, and 3,5,5-trimethylhexanoic acid.

Also usable herein are complex esters composed of semiesters of aliphatic polyalcohols with linear or branched C3–9 fatty acids, and aliphatic dibasic acids or aromatic dibasic acids. For such complex esters, preferred are C5–7 fatty acids, more preferably C5–6 fatty acids. The fatty acids of that type include valeric acid, hexanoic acid, isovaleric acid, 2-methylbutyric acid, 2-ethyl butyric acid, and their mixtures. Especially preferred are mixtures of a C5 fatty acid and a C6 fatty acid as mixed in a ratio by weight falling between 10/90 and 90/10. Along with those fatty acids, used are aliphatic dibasic acids for esterification with polyalcohols. The aliphatic dibasic acids include succinic acid, adipic acid, pimelic acid, suberic acid, azelaic acid, sebacic acid, undecane-diacid, dodecane-diacid, tridecane-diacid, and docosane-diacid. Also usable are aromatic dibasic acids, including phthalic acid and isophthalic acid. The esterification for preparing the complex esters comprises reacting a polyalcohol with a dibasic acid in a predetermined ratio to give a semiester followed by reacting the resulting semiester with a fatty acid, or the order of reacting a polyalcohol with a dibasic acid and a fatty acid may be reversed, or a dibasic acid and a fatty acid may be mixed and reacted both at a time with a polyalcohol for the intended esterification.

Also preferred for use herein are polyalcohol esters to be prepared by reacting an acid fluoride of a general formula (I):

(I)

wherein $R^1$ to $R^3$ each represent a C1–13 alkyl group provided that the alkyl group having 4 or more carbon atoms shall have at least one branch and that the total of the carbon atoms constituting $R^1$ to $R^3$ shall fall between 3 and 23, with a polyalcohol, as their moisture absorption to saturation is low (see Japanese Patent Laid-Open No. 157219/1997).

(2) Aliphatic or aromatic polycarboxylates:

Dicarboxylates are usable herein, which may be dialkyl esters of aliphatic or aromatic dicarboxylic acids (having from 16 to 22 carbon atoms).

The aliphatic dicarboxylic acids include succinic acid, glutaric acid, adipic acid, pimelic acid, suberic acid, azelaic acid, sebacic acid, undecane-diacid, dodecane-diacid, tridecane-diacid, and docosane-diacid; and the aromatic dicarboxylic acids include phthalic acid, and isophthalic acid. The alcohol components for the esters may be of C5–8 alcohols, including, for example, amyl alcohol, hexyl alcohol, heptyl alcohol, and octyl alcohol. Preferred examples of the esters are dioctyl adipate, diisoheptyl adipate, dihexyl sebacate, diheptyl succinate, dioctyl phthalate, diisoheptyl phthalate, and diisoamyl phthalate.

Tri- or higher poly-carboxylates are also usable herein, for which polycarboxylic acids may be aliphatic polycarboxylic acids such as 1,2,3,4-butane-tetracarboxylic acid, or aromatic polycarboxylic acids such as trimellitic acid, and pyromellitic acid. The alcohol components for the esters may be of monoalcohols with a linear or branched C3–12 alkyl group, or polyalkylene glycol monoalcohols of a formula, H—(AO)$_n$—R in which A indicates a C2–8 alkylene group, R indicates a C1–10 alkyl group, and n is an integer of from 1 to 10. Herein usable are polycarboxylates to be prepared by esterifying the polycarboxylic acids mentioned above with alcohols such as those also mentioned above, as well as complex esters to be prepared by reacting those polycarboxylic acids with those alcohols and further with other polyalcohols such as ethylene glycol or propylene glycol for esterification.

(3) Alicyclic polycarboxylates:

Alicyclic polycarboxylates for use herein may be represented by the following general formula (II):

(II)

wherein A indicates a cyclohexane ring or a cyclohexene ring; $R^4$ indicates a hydrogen atom or a methyl group; X indicates a hydrogen atom or $COOR^7$; Y indicates a hydrogen atom or $COOR^8$; and $R^5$ to $R^8$ each indicate a C3–18 alkyl group or a C3–10 cycloalkyl group, and they may be the same or different.

These esters may be prepared by esterifying a predetermined acid component with a predetermined alcohol component in any ordinary manner, but preferably in an inert gas atmosphere of nitrogen gas or the like, in the presence or absence of an esterification catalyst, and under heat with stirring the components.

The acid component includes cycloalkane-polycarboxylic acids, cycloalkene-polycarboxylic acids and their anhydrides. One or more of those compounds may be used either singly or as combined, for the acid component. Concretely mentioned are 1, 2-cyclohexane-dicarboxylic acid, 4-cyclohexene-1,2-dicarboxylic acid, 1-cyclohexene-1,2-dicarboxylic acid, 1,3-cyclohexane-dicarboxylic acid, 1,4-cyclohexane-dicarboxylic acid, 3-methyl-1,2-cyclohexane-dicarboxylic acid, 4-methyl-1,2-cyclohexane-dicarboxylic acid, 3-methyl-4-cyclohexene-1,2-dicarboxylic acid, 4-methyl-4-cyclohexene-1,2-dicarboxylic acid, 1,2,4-cyclohexane-tricarboxylic acid, 1,3,5-cyclohexane-tricarboxylic acid, 1,2,4,5-cyclohexane-tetracarboxylic acid, and their anhydrides. Of those, preferred are 1,2-cyclohexane-dicarboxylic acid, 3-methyl-1,2-cyclohexane-dicarboxylic acid, 4-methyl-1,2-cyclohexane-dicarboxylic acid, 4-cyclohexene-1,2-dicarboxylic acid, 3-methyl-4-cyclohexene- 1,2-dicarboxylic acid, 4-methyl-4-cyclohexene-1,2-dicarboxylic acid, and their anhydrides.

The alcohol component includes linear or branched aliphatic C3–18 alcohols, and alicyclic C3–10 alcohols. Specific examples of the linear aliphatic alcohols are n-propyl alcohol, n-butanol, n-pentanol, n-hexanol, n-heptanol, n-octanol, n-nonanol, n-decanol, n-undecanol, n-dodecanol, n-tetradecanol, n-hexadecanol, n-octadecanol, etc.

Specific examples of the branched aliphatic alcohols are isopropanol, isobutanol, sec-butanol, isopentanol, isohexanol, 2-methylhexanol, 2-methylheptanol, isoheptanol, 2-ethylhexanol, 2-octanol, isooctanol, 3,5,5-trimethylhexanol, isodecanol, isoundexanol, isotridecanol, isotetradecanol, isohexadecanol, isooctadecanol, 2,6-dimethyl-4-heptanol, etc.

Specific examples of the alicyclic alcohols are cyclohexanol, methylcyclohexanol, dimethylcyclohexanol, etc.

Of those alicyclic polycarboxylates to be prepared from such polycarboxylic acids and alcohols, especially preferred are diisobutyl 1,2-cyclohexane-dicarboxylate, dicyclohexyl 1,2-cyclohexane-dicarboxylate, diisoheptyl 1,2-cyclohexane-dicarboxylate, di(2-ethylhexyl) 1,2-cyclohexane-dicarboxylate, di(3,5,5-trimethylhexyl) 1,2-cyclohexane-dicarboxylate, di(2,6-dimethyl-4-heptyl) 1,2-cyclohexane-dicarboxylate, diisodecyl 1,2-cyclohexane-dicarboxylate, diisoundecyl 1,2-cyclohexane-dicarboxylate, dicyclohexyl 4-cyclohexene-1,2-dicarboxylate, diisoheptyl 4-cyclohexene-1,2-dicarboxylate, di(2-ethylhexyl) 4-cyclohexene-1,2-dicarboxylate, di(3,5,5-trimethylhexyl) 4-cyclohexene-1,2-dicarboxylate, di(3,5,5-trimethylhexyl) 3-methyl-1,2-cyclohexane-dicarboxylate, di(3,5,5-trimethylhexyl) 4-methyl-1,2-cyclohexane-dicarboxylate, di(3,5,5-trimethylhexyl) 3-methyl-4-cyclohexene-1,2-dicarboxylate, di(3,5,5-trimethylhexyl) 4-methyl-4-cyclohexene-1,2-dicarboxylate, and tetra(3,5,5-trimethylhexyl) 1,2,4,5-cyclohexane-tetracarboxylic acid.

The alicyclic polycarboxylates may be mixed with any other esters (hereinafter these are referred to as additional esters), with which their physical balance including volume-specific resistivity and viscosity could be improved. The additional esters include adipates, azelates, sebacates, phthalates, trimellitates, and polyalcohol esters. The polyalcohol component for the polyalcohol esters includes neopentyl glycol, trimethylolpropane, pentaerythritol, dipentaerythritol, etc. The acid component for them includes isobutyric acid, 2-ethylbutyric acid, isovaleric acid, pivalic acid, cyclohexanecarboxylic acid, 2-methylpentanoic acid, 2-ethylpentanoic acid, 2-methylhexanoic acid, 2-ethylhexanoic acid, 3,5,5-trimethylhexanoic acid, etc. Of the lubricating oil for use herein, the additional ester content may fall between 10 and 90% by weight.

(4) Other organic carboxylates:

Other organic carboxylates except the esters (1) to (3) noted above include diesters to be prepared by esterifying monoalcohol-alkylene oxide adducts with aliphatic dicarboxylic acids such as adipic acid, pimelic acid, suberic acid, azelaic acid, sebacic acid, undecane-diacid, dodecane-diacid, or docosane-diacid, or with aromatic dicarboxylic acids such as phthalic acid. They further include esters to be prepared by esterifying polyalcohol-alkylene oxide (1 to 10 mols) adducts in which the polyalcohol may be, for example, glycerin or trimethylolpropane, with C3–12 fatty acids such as propionic acid, butyric acid, valeric acid, hexanoic acid, heptanoic acid, octanoic acid, nonanoic acid, decanoic acid, dodecanoic acid, 2-methylhexanoic acid, 2-ethylhexanoic acid, isooctanoic acid, isononanoic acid, isodecanoic acid, 2,2-dimethyloctanoic acid, or 2-butyloctanoic acid.

(5) Carbonates:

Carbonates for use herein include compounds of a general formula (III):

(III)

wherein $R^9$ indicates a C2–10 alkyl group; $R^{10}$ indicates a C2–10 alkylene or cycloalkylene group; and a is an integer of from 1 to 4, and compounds of a general formula (IV):

(IV)

wherein $R^{11}$ indicates a hydroxyl group-having C2–6 polyalcohol residue; $R^{12}$ indicates a C2–10 alkyl group; and b is an integer of from 2 to 6.

Those carbonates may be prepared by interesterifying dimethyl carbonate with alcohols in the presence of a basic catalyst.

Also usable herein are compounds of a general formula (V)

(V)

wherein $R^{13}$ indicates a C1–10 alkyl group; $R^{14}$ indicates a C2–10 alkyl group; c is an integer of from 2 to 10; d is an integer of from 2 to 100; and —BO— indicates —CH$_2$—CH(CH$_3$)—O— or —CH$_2$—CH$_2$—O—.

The carbonates may be prepared, for example, by reacting carbonic acid with alkylene oxides. In those, the alkylene oxide moiety added to the carbonate moiety may be from a single ethylene oxide or a single propylene oxide or may also be from their mixture.

(6) Fumarate oligomers:

Fumarate oligomers are homopolymers of fumarates or copolymers of fumarates with unsaturated aliphatic hydrocarbons, and may be represented by a general formula (VI)

(VI)

wherein $R^{15}$ indicates an alkylene group, a substituted alkylene group, or an alkylene oxide group; $R^{16}$ and $R^{17}$ each indicate a C1–9 alkyl group, an allyl group, or a terminal-substituted or unsubstituted polyalkylene oxide group, and these may be the same or different; e is 0 or an integer of at least one, f is an integer of at least one; and $R^{15}$ is not larger than 50 mol % of the oligomer.

Concretely mentioned are diethyl fumarate oligomers and dibutyl fumarate oligomers.

In formula (VI), both terminals are of residues of the polymerization initiation used in polymerization to give the oligomers, and are not shown.

Also mentioned are alkyl fumarate copolymers comprising from 1 to 50 mol % of structural units of a formula (VII):

(VII)

and from 50 to 99 mol % of structural units of a general formula (VIII):

(VIII)

wherein $R^{18}$ and $R^{19}$ each indicate a C3–8 alkyl group, and they may be the same or different.

(7) Hydroxypivalates:

Herein employable are hydroxypivalates of a general formula (IX):

(IX)

wherein $R^{20}$ and $R^{21}$ each indicate a C2–10 alkyl group, and g is an integer of from 1 to 5.

Of the ester oils (1) to (7) mentioned above, one or more of the same type or different types may be in the base oil for use in the invention, either singly or as combined. Regarding its viscosity, the base oil must be so controlled that its kinematic viscosity at 100° C. falls between 5.5 and 30 mm$^2$/sec, as so mentioned hereinabove. Where the ester oil noted above is in the base oil and if its viscosity oversteps the defined range, any other components may be added thereto so as to suitably control the viscosity of the resulting base oil. For example, if its viscosity is higher than the defined range, the ester oil may be combined with any other ester oil of an aliphatic polyalcohol with a C3–9 fatty acid having a kinematic viscosity at 100° C. of not higher than 6 mm$^2$/sec, thereby giving a base oil of which the viscosity is controlled to fall within the defined range. On the other hand, if its viscosity is lower than the defined range, the ester oil may be combined with polymers so as to control its viscosity to fall within the defined range. The polymers preferably have a kinematic viscosity at 100° C. of not lower than 10 mm$^2$/sec.

As examples of the polymers of that type, mentioned are polyalkyl methacrylates (for example, those in which the alkyl group has from 1 to 8 carbon atoms); polyalkylene glycols (such as polypropylene glycols, copolymers of polypropylene glycol and polyethylene glycol, copolymers of polypropylene glycol and polybutylene glycol); and polyesters of neopentyl glycol with aliphatic dicarboxylic acids, which are represented by a general formula (X):

(X)

wherein h is an integer of from 1 to 20; and i is an integer of from 1 to 10.

The base oil for the lubricating oil composition that constitutes the second embodiment of the invention has a kinematic viscosity of from 56 to 130 mm$^2$/sec at 40° C. The kinematic viscosity at 40° C. of the base oil preferably falls between 56 and 130 mm$^2$/sec, more preferably between 70 to 120 mm$^2$/sec, in view of the efficiency and the lubricity of the compressor to which is applied the refrigerator oil composition of the invention.

The base oil comprises an ester oil as the essential component. The ester oil includes (1) esters of pentaerythritol with C8 and/or C9 fatty acids, (2) carbonates, and their mixtures. These are described hereunder in that order.

(1) Pentaerythritol esters:

For pentaerythritol esters for use herein, C8 and C9 fatty acids may be either linear ones or branched ones. They may be either saturated fatty acids or unsaturated fatty acids, but preferred are saturated fatty acids. One or more of C8 fatty acids may be used. Also one or more of C9 fatty acids may be used. Preferably employed is a mixed acid of C8 and C9 fatty acids; and more preferred is a mixed acid of branched C8 and C9 fatty acids. In the mixed acid, the ratio of the molar fractions of the C8 fatty acid and the C9 fatty acid may fall between 90/10 and 10/90. Preferred examples of the C8 fatty acid are octanoic acid, isooctanoic acid, and 2-ethylhexanoic acid; and those of the C9 fatty acid are nonanoic acid, isononanoic acid, 2-ethylheptanoic acid, and 3,3,5-trimethylhexanoic acid.

Also usable are semiesters of pentaerythritol with fatty acids such as those noted above.

Further usable are complex esters composed of semiesters of pentaerythritol with C8 and/or C9 fatty acids, and aliphatic dibasic acids or aromatic dibasic acids. For such complex esters, the aliphatic dibasic acids include succinic acid, adipic acid, pimelic acid, suberic acid, azelaic acid, sebacic acid, undecane-diacid, dodecane-diacid, tridecane-diacid, and docosane-diacid. For those, the aromatic dibasic acids include phthalic acid and isophthalic acid. The esterification for preparing the complex esters comprises reacting the polyalcohol with a dibasic acid in a predetermined ratio to give a semiester followed by reacting the resulting semiester with a fatty acid, or the order of reacting the polyalcohol with a dibasic acid and a fatty acid may be reversed, or a dibasic acid and a fatty acid may be mixed and reacted both at a time with the polyalcohol for the intended esterification.

(2) Carbonates:

Carbonates for use herein include compounds of a general formula (I):

(I)

wherein $R^1$ indicates a C2–10 alkyl group; $R^2$ indicates a C2–10 alkylene or cycloalkylene group; and a is an integer of from 1 to 4,
and compounds of a general formula (II):

(II)

wherein $R^3$ indicates a hydroxyl group-having C2–6 polyalcohol residue; $R^4$ indicates a C2–10 alkyl group; and b is an integer of from 2 to 6.

Those carbonates may be prepared by interesterifying dimethyl carbonate with alcohols in the presence of a basic catalyst.

Also usable herein are compounds of a general formula (III):

(III)

wherein $R^5$ indicates a C1–10 alkyl group; $R^6$ indicates a C2–10 alkyl group; c is an integer of from 2 to 10; d is an integer of from 2 to 100; and -AO— indicates —$CH_2$—CH($CH_3$)—O— or —$CH_2$—$CH_2$—O—.

The carbonates may be prepared, for example, by reacting carbonic acid with alkylene oxides. In those, the alkylene oxide moiety added to the carbonate moiety may be from a single ethylene oxide or a single propylene oxide or may also be from their mixture.

Of the ester oils (1) and (2) mentioned above, one or more of the same type or different types may be in the base oil for use in the invention, either singly or as combined. If desired, ester oils (1) and (2) may be mixed for use in the base oil. Regarding its viscosity, the base oil must be so controlled that its kinematic viscosity at 40° C. falls between 56 and 130 mm²/sec, as so mentioned hereinabove. Where the ester oil noted above is in the base oil and if its viscosity oversteps the defined range, any other components may be added thereto so as to suitably control the viscosity of the resulting base oil. For example, if its viscosity is higher than the defined range, the ester oil may be combined with any other ester oil of an aliphatic polyalcohol with a C3–9 fatty acid having a kinematic viscosity at 100° C. of not higher than 6 mm²/sec, thereby giving a base oil of which the viscosity is controlled to fall within the defined range. On the other hand, if its viscosity is lower than the defined range, the ester oil may be combined with polymers so as to control its viscosity to fall within the defined range. The polymers preferably have a kinematic viscosity at 100° C. of not lower than 10 mm²/sec.

As examples of the polymers of that type, mentioned are polyalkyl methacrylates (for example, those in which the alkyl group has from 1 to 8 carbon atoms); polyalkylene glycols (such as polypropylene glycols, copolymers of polypropylene glycol and polyethylene glycol, copolymers of polypropylene glycol and polybutylene glycol); and polyesters of neopentyl glycol with aliphatic dicarboxylic acids, which are represented by a general formula (IV):

(IV)

wherein e is an integer of from 1 to 20; and f is an integer of from 1 to 10.

The base oil comprising, as the essential component, the ester oil noted above is generally such that the two-layer separating temperature (of the higher temperature component) at which the refrigerator oil composition comprising the base oil and having an oil content of 10% by weight (and therefore having a refrigerant content of 90% by weight) is separated into two layers is not lower than 5° C., but preferably not lower than 10° C., more preferably not lower than 15° C. The temperature indicates the compatibility between the oil component and the refrigerant component that constitute the refrigerator oil composition in practical use of the oil composition in refrigerators, and has a significant influence on the lubricity of the oil composition being actually used in refrigerators.

The lubricating oil composition for use in the invention is prepared by adding to the base oil, from 0.005 to 5% by weight, relative to the base oil, of an extreme pressure agent and/or an acid scavenger.

The extreme pressure agent may be a sulfur-containing extreme pressure agent, including, for example, sulfidized oils and fats, sulfidized fatty acids, ester sulfides, olefin sulfides, dihydrocarbyl polysulfides, thiocarbamates, thioterpenes, and dialkylthio dipropionates. The sulfidized oils and fats may be prepared by reacting sulfur or a sulfur-containing compound with oils and fats (lard oil, whale oil, vegetable oil, fish oil, etc.). Their sulfur content is not specifically defined, but preferably falls between 5 and 30% by weight. Specific examples of the sulfidized oils and fats are sulfidized lard, sulfidized rapeseed oil, sulfidized castor oil, sulfidized soybean oil, and sulfidized rice bran oil. One example of the sulfidized fatty acids is oleic acid sulfide. Examples of the ester sulfides are methyl oleate sulfide, and sulfidized octyl esters of rice bran fatty acids.

As the olefin sulfides, for example, mentioned are compounds of a general formula (XI):

$$R^{22}-S_j-R^{23} \qquad (XI)$$

wherein $R^{22}$ indicates a C2–15 alkenyl group; $R^{23}$ indicates a C2–15 alkyl or alkenyl group; and j is an integer of from 1 to 8.

The compounds may be prepared by reacting a C2–15 olefin or its dimer, trimer or tetramer with a sulfidizing agent such as sulfur or sulfur chloride. As the olefin, preferred are propylene, isobutene and diisobutene.

The dihydrocarbyl polysulfides are compounds of a general formula (XII):

$$R^{24}-S_k-R^{25} \qquad (XII)$$

wherein $R^{24}$ and $R^{25}$ each indicate a C1–20 alkyl or cycloalkyl group, a C6–20 aryl group, a C7–20 alkylaryl group, or a C7–20 arylalkyl group, and these may be the same or different; and k is an integer of from 2 to 8.

Of the compounds, those where $R^{24}$ and $R^{25}$ are both alkyl groups are referred to as alkyl sulfides.

In formula (XII), specific examples of $R^{24}$ and $R^{25}$ are a methyl group, an ethyl group, an n-propyl group, an isopropyl group, an n-butyl group, an isobutyl group, a sec-butyl group, a tert-butyl group, all types of pentyl groups, all types of hexyl groups, all types of heptyl groups, all types of octyl groups, all types of nonyl groups, all types of decyl groups, all types of dodecyl groups, a cyclohexyl group, a cyclooctyl group, a phenyl group, a naphthyl group, a tolyl group, a xylyl group, a benzyl group, and a phenethyl group.

Preferred examples of the dihydrocarbyl polysulfides are dibenzyl polysulfide, di-tert-nonyl polysulfide, didodecyl polysulfide, di-tert-butyl polysulfide, dioctyl polysulfide, diphenyl polysulfide, and dicyclohexyl polysulfide.

One example of the thiocarbamates is zinc dithiocarbamate; examples of the thioterpenes are reaction products of phosphorus pentasulfide with pinene; and examples of the dialkylthio dipropionates are dilaurylthio dipropionate and distearylthio dipropionate.

As the extreme pressure agent, also usable are phosphorus-containing extreme pressure agents, including, for example, phosphates, acid phosphates, phosphites, acid phosphites, thiophosphates, acid thiophosphates, and their amine salts, as well as terpene phosphosulfides such as reaction products of phosphorus pentasulfide with pinene mentioned above. The phosphates, acid phosphates, phosphates and acid phosphites include compounds of the following general formulae (XIII) to (XVII):

(XIII)

-continued (XIV)

(XV)

(XVI)

(XVII)

In those formulae (XIII) to (XVII), $R^{26}$ to $R^{28}$ each indicate a C4–30 alkyl, alkenyl, alkylaryl or arylalkyl group, and these may be the same or different.

Concretely, the phosphates include triaryl phosphates, trialkyl phosphates, trialkylaryl phosphates, triarylalkyl phosphates, and trialkenyl phosphates. Their specific examples are triphenyl phosphate, tricresyl phosphate, benzyldiphenyl phosphate, ethyldiphenyl phosphate, tributyl phosphate, ethyldibutyl phosphate, cresyldiphenyl phosphate, dicresylphenyl phosphate, ethylphenyldiphenyl phosphate, diethylphenylphenyl phosphate, propylphenyldiphenyl phosphate, dipropylphenylphenyl phosphate, triethylphenyl phosphate, tripropylphenyl phosphate, butylphenyldiphenyl phosphate, dibutylphenylphenyl phosphate, tributylphenyl phosphate, trihexyl phosphate, tri(2-ethylhexyl) phosphate, tridecyl phosphate, trilauryl phosphate, trimyristyl phosphate, tripalmityl phosphate, tristearyl phosphate, and trioleyl phosphate.

Specific examples of the acid phosphates are 2-ethylhexyl acid phosphate, ethyl acid phosphate, butyl acid phosphate, oleyl acid phosphate, tetracosyl acid phosphate, isodecyl acid phosphate, lauryl acid phosphate, tridecyl acid phosphate, stearyl acid phosphate, and isostearyl acid phosphate.

Specific examples of the phosphites are triethyl phosphite, tributyl phosphite, triphenyl phosphate, tricresyl phosphite, tri (nonylphenyl) phosphite, tri (2-ethylhexyl) phosphite, tridecyl phosphite, trilauryl phosphite, triisooctyl phosphite, diphenylisodecyl phosphite, tristearyl phosphite, trioleyl phosphite, and 2-ethylhexyldiphenyl phosphite.

Specific examples of the acid phosphites are dibutyl hydrogenphosphite, dilauryl hydrogenphosphite, dioleyl hydrogenphosphite, distearyl hydrogenphosphite, and diphenyl hydrogenphosphite.

The thiophosphates and the acid thiophosphates are thio-derivatives from the phosphates and acid phosphates specifically exemplified hereinabove.

Amines to form amine salts with the compounds mentioned above are, for example, mono-substituted amines, di-substituted amines and tri-substituted amines of a general formula (XVIII):

$$R_m NH_{3-m} \qquad (XVIII)$$

wherein R indicates a C3–30 alkyl or alkenyl group, a C6–30 aryl or aralkyl group, or a C2–30 hydroxyalkyl group, and m is 1, 2 or 3; and plural R's, if any, maybe the same or different.

The C3–30 alkyl or alkenyl group for R in formula (XVIII) may be linear, branched or cyclic.

Specific examples of the mono-substituted amines are butylamine, pentylamine, hexylamine, cyclohexylamine, octylamine, laurylamine, stearylamine, oleylamine, and benzylamine; and those of di-substituted amines are dibutylamine, dipentylamine, dihexylamine, dicyclohexylamine, dioctylamine, dilaurylamine, distearylamine, dioleylamine, dibenzylamine, stearylmonoethanolamine, decylmonoethanolamine, hexylmonoethanolamine, benzylmonoethanolamine, phenylmonoethanolamine, and tolylmonopropanolamine. Specific examples of tri-substituted amines are tributylamine, tripentylamine, trihexylamine, tricyclohexylamine, trioctylamine, trilaurylamine, tristearylamine, trioleylamine, tribenzylamine, dioleylmonoethanolamine, dilaurylmonopropanolamine, dioctylmonoethanolamine, dihexylmonopropanolamine, dibutylmonopropanolamine, oleyldiethanolamine, stearyldipropanolamine, lauryldiethanolamine, octyldipropanolamine, butyldiethanolamine, benzyldiethanolamine, phenyldiethanolamine, tolyldipropanolamine, xylyldiethanolamine, triethanolamine, and tripropanolamine.

Of those phosphorus-containing extreme pressure agents, preferred are tricresyl phosphate, tri (nonylphenyl) phosphite, dioleyl hydrogenphosphite, and 2-ethylhexyldiphenyl phosphate, as having good extreme pressure-improving capabilities and good friction-reducing capabilities.

The lubricating oil composition for use in the invention may contain one or more of the extreme pressure agents noted above, either singly or as combined. The extreme pressure agent content of the composition preferably falls between 0.005 and 5% by weight relative to the base oil in the composition. If the content is smaller than 0.005% by weight, the lubricating oil composition could not have good pressure resistance and friction resistance. On the other hand, if the content is larger than 5% by weight, the composition will form much sludge.

The acid scavenger to be in the lubricating oil composition for use in the invention is to improve the hydrolysis resistance of the refrigerator oil composition of the invention. For example, it includes epoxy compounds such as phenyl glycidyl ethers, alkyl glycidyl ethers, alkylene glycol glycidyl ethers, cyclohexene oxides, α-olefin oxides, and epoxidated soybean oils. Of those, preferred are phenyl glycidyl ethers, alkyl glycidyl ethers, alkylene glycol glycidyl ethers, cyclohexene oxides and α-olefin oxides, in view of their compatibility with base oil.

The lubricating oil composition may contain one or more of those acid scavengers either singly or as combined. The acid scavenger content of the composition preferably falls between 0.005 and 5% by weight relative to the base oil in the composition. If the content is smaller than 0.005% by weight, the acid scavenger could not exhibit its acid-scavenging capabilities. On the other hand, if the content is larger than 5% by weight, the acid scavenger will cause sludge formation in the composition. When the lubricating oil composition contains both the extreme pressure agent and the acid scavenger in combination, the total amount of the additives shall fall between 0.005 and 5% by weight relative to the base oil in the composition.

The lubricating oil composition that constitutes the refrigerator oil composition of the invention may optionally contain any known additives not interfering with the object of the invention. The optional additives include, for example, phenolic or amine-based antioxidants, copper inactivators of benzotriazole and its derivatives, and defoaming agents of silicone oils and fluorosilicone oils. The additive content of the lubricating oil composition may fall between 0.5 and 10% by weight.

In the invention, the ratio of the $CO_2$-based refrigerant to the lubricating oil composition preferably falls between 99/1 and 10/90 in terms of the ratio by weight of refrigerant/lubricating oil composition. If the refrigerant content of the composition is smaller than the defined range, the refrigerating capabilities of the composition will be poor. If, on the other hand, the refrigerant content is larger than that range, the lubricating capabilities of the composition will be poor. Anyhow, the refrigerant content overstepping the defined range is unfavorable. For these reasons, the ratio by weight of refrigerant/lubricating oil composition is more preferably from 95/5 to 30/70.

Figure 1:
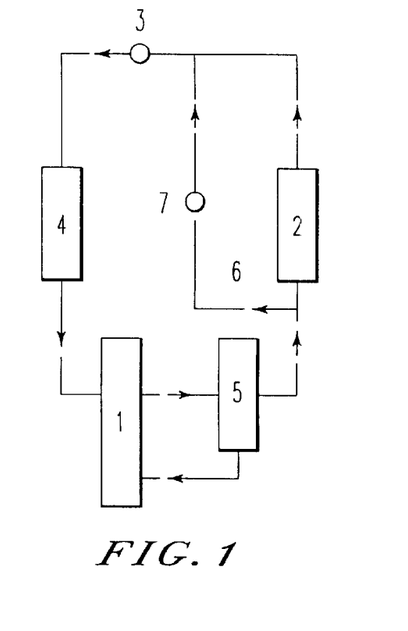
FIG. 1 is a flowchart showing one embodiment of a compression refrigeration cycle of "compressor-condenser-expansion valve-evaporator", which is equipped with an oil separator and a hot gas line.
Figure 2:
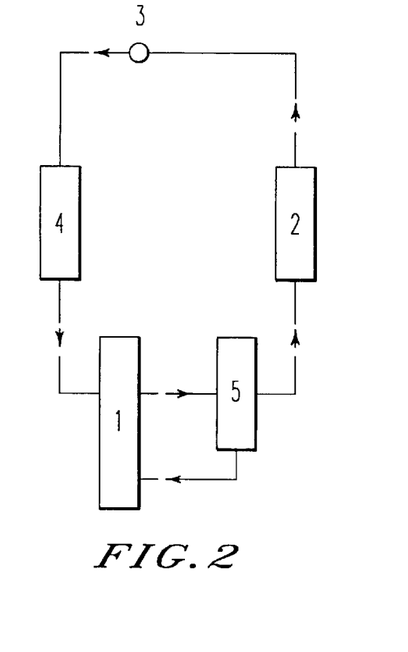
FIG. 2 is a flowchart showing one embodiment of a compression refrigeration cycle of "compressor-condenser-expansion valve-evaporator", which is equipped with an oil separator.
Figure 3:
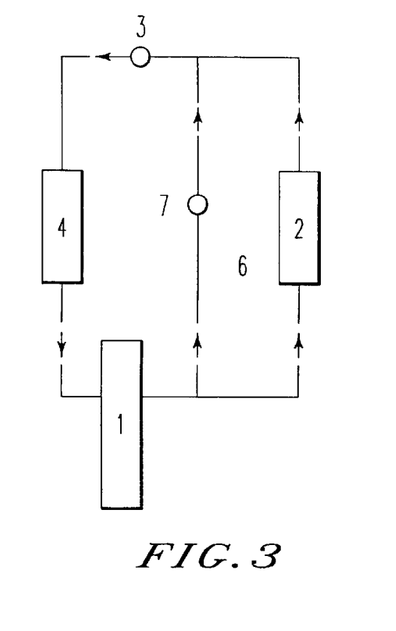
FIG. 3 is a flowchart showing one embodiment of a compression refrigeration cycle of "compressor-condenser-expansion valve-evaporator", which is equipped with a hot gas line.
Figure 4:
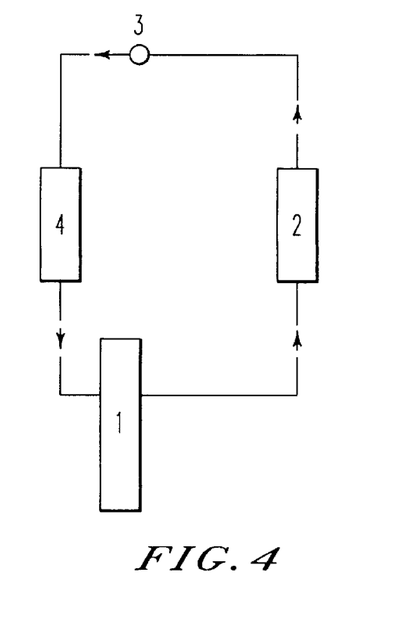
FIG. 4 is a flowchart showing one embodiment of a compression refrigeration cycle of "compressor-condenser-expansion valve-evaporator".

The refrigerator oil composition of the invention is applicable to various types of refrigerators, and is especially suitable to the compression refrigeration cycle for compression refrigerators. In particular, the refrigerator oil composition of the invention exhibits its effects more effectively, when applied to compression refrigeration cycles equipped with an oil separator and/or a hot gas line, such as those illustrated in FIGS. 1 to 3 attached hereto. As a rule, a compression refrigeration cycle comprises compressor-condenser-expansion valve-evaporator. The lubricating oil for refrigerators generally has good compatibility with the refrigerant for them. However, when a carbon dioxide-based refrigerant is used in the refrigeration cycle as above and when the refrigerator is lubricated with ordinary lubricating oil, the ability of the oil composition to prevent machine parts from being worn away will be often poor and the stability of the oil composition will be also poor. As a result, it is often impossible to use the oil composition for a long period of time. In particular, this tendency is noticeable when the oil composition is used in refrigeration cycles for electric refrigerators or small-sized air conditioners in which a capillary tube is used as the expansion valve. Given that situation, the lubrication method of the invention for driving a compression refrigeration cycle equipped with an oil separator and/or a hot gas line, for which is used a carbon dioxide-based refrigerant, is characterized in that a refrigerator oil composition comprising a carbon dioxide ($CO_2$)-based refrigerant and an ester-based lubricating oil composition in a ratio by weight of refrigerant/lubricating oil composition of falling between 99/1 and 10/90 is used for the lubrication.

EXAMPLES

The invention is described more concretely with reference to the following Examples, which, however, are not intended to restrict the scope of the invention.

The properties and the capabilities of the lubricating oil composition were determined according to the following methods.

(1) Solubility:

Into 100 g of an oil sample, introduced was carbon dioxide under a pressure of 50 $kg/cm^2$, and the amount (% by weight) of carbon dioxide dissolved in the oil sample was measured.

(2) Sealed Tube Test:

A catalyst of Fe/Cu/Al was put into a glass tube, to which were added carbon dioxide/oil sample/water in a ratio of 0.5 g/4 g/0.02 g, and the tube was sealed. After having been stored therein at 175° C. for 10 days, the appearance of the oil sample and that of the catalyst were observed, the increase in the total acid value of the oil sample was obtained, and the presence or absence of sludge in the tube was checked.

(3) Moisture Absorption Test:

10 g of an oil sample was left at a humidity of 85% RH (at 30° C.) for 120 hours, and its water absorption (% by weight) was measured.

(4) Falex Burning Test:

Used herein was a Falex tester with a pin/block combination of AISIC1137/SAE3135. The pin/block combination was set in the tester, then 200 g of an oil sample was introduced into the tester, and carbon dioxide was introduced thereinto at a flow rate of 5 liters/hr. In that condition, the tester was run at a rotating speed of 290 rpm, and the burning load at an oil temperature of 50° C. was measured.

Examples 1 to 4, and Comparative Examples 1 and 2

To the base oil, of which the properties are shown in Table 1, added were 1% by weight, relative to the base oil, of tricresyl phosphate (TCP) and 1.5% by weight, relative to the same, of α-olefinoxide (Examples 1, 2) or phenyl glycidyl ether (Examples 3, 4, and Comparative Examples 1, 2), to prepare lubricating oil compositions. These were tested according to the test methods mentioned above. The test results are in Table 2.

Examples 5 to 13, and Comparative Examples 3 to 5

Base oils, of which the properties are shown in Table 3, were tested according to the test methods mentioned above. The test results are in Table 4.

Examples 14 to 17, and Comparative Examples 6 to 8

To the base oil shown in Table 5, added were 1% by weight, relative to the base oil, of tricresyl phosphate (TCP) and 1.5% by weight, relative to the same, of α-olefin oxide (Examples 14, 15) or phenyl glycidyl ether (Examples 16, 17, and Comparative Examples 6 to 8), to prepare lubricating oil compositions. These were tested in practical refrigerators, and evaluated for their properties. The test results are in Table 5.

Examples 18 to 22, and Comparative Examples 9 to 11

To the base oil shown in Table 6, added were 1% by weight, relative to the base oil, of tricresyl phosphate (TCP) and 1.5% by weight, relative to the same, of α-olefin oxide (Examples 18, 19) or phenyl glycidyl ether (Examples 20 to 22, and Comparative Examples 9 to 11), to prepare lubricating oil compositions. These were tested in practical refrigerators, and evaluated for their properties. The test results are in Table 6.

For the practical test of the lubricating oil compositions, the compression refrigeration cycle mode used was as follows:

Compression Refrigeration Cycle Mode in Practical Test:

A: Used is a compression refrigeration cycle of "compressor-condenser-expansion valve-evaporator" equipped with an oil separator (see FIG. 2).

In this, the expansion valve used is of a capillary type.

In the test, used was a 100 W refrigerator, and this was run in the cycle mode A. Carbon dioxide was used as the refrigerant, and an oil composition composed of 70% by weight of carbon dioxide and 30% by weight of the lubricating oil composition indicated herein was applied to the refrigerator. The refrigerator was tested for a period of one year, under the condition shown below.

Running Condition:

Temperature of oil composition being introduced into the test system: 0° C.

Temperature of oil composition running out of the test system: 100° C.

Temperature at outlet of condenser: 10° C.

Method for Evaluation:

When the refrigerator became out of order, it was stopped and checked for the reason for the accident.

TABLE 1

| Base oil | | Kinematic Viscosity (mm²/sec) (100° C.) |
|---|---|---|
| MO | naphthene-based mineral oil | 22.4 |
| AB | alkylbenzene | 3.7 |
| POE1 | dipentaerythritol 2-ethylhexanoate | 10.2 |
| POE2 | dipentaerythritol 2-ethylhexanoate 2-ethylpentanoate | 11.7 |
| POE3 | polyalcohol ester in Example 1 in Japanese Patent Laid-Open No. 157219/1997 | 9.1 |
| POE4 | polycarboxylate in Production Example 1 in Japanese Patent Laid-Open No. 221690/1997 | 9.2 |

TABLE 2

| | | | Sealed Tube Test Results | | | | | |
|---|---|---|---|---|---|---|---|---|
| | Base Oil | Dissolved $CO_2$ (%) | Oil Appearance | Catalyst Appearance | Total Acid Value | Sludge | Moisture Absorption (%) | Burning Load (Lbs) |
| Example 1 | POE1 | 32 | good | good | 0.08 | no | 0.30 | 900 |
| Example 2 | POE2 | 34 | good | good | 0.06 | no | 0.27 | 950 |
| Example 3 | POE3 | 28 | good | good | 0.03 | no | 0.41 | 870 |
| Example 4 | POE4 | 29 | pale yellow | partly | 0.25 | no | 0.44 | 790 |

TABLE 2-continued

| | Base Oil | Dissolved $CO_2$ (%) | Oil Appearance | Catalyst Appearance | Total Acid Value | Sludge | Moisture Absorption (%) | Burning Load (Lbs) |
|---|---|---|---|---|---|---|---|---|
| Comp. Example 1 | MO | 8 | good | yellowed good | 0.01> | no | 0.1> | 500 |
| Comp. Example 2 | AB | 9 | good | good | 0.01> | no | 0.1> | 350 |

TABLE 3

| | Base oil | Kinematic Viscosity (mm²/sec) (40° C.) |
|---|---|---|
| POE5 | pentaerythritol octanoate | 78.7 |
| POE6 | pentaerythritol nonanoate | 123.5 |
| POE7 | pentaerythritol 2-ethylhexanoate | 83.7 |
| POE8 | pentaerythritol isooctanoate | 78.8 |
| POE9 | pentaerythritol 3,5,5-trimethylhexanoate | 102.5 |
| POE10 | pentaerythritol 2-ethylhexanoate(0.2) 3,5,5-trimethylhexanoate(0.8) | 937 |
| POE11 | pentaerythritol octanoate(0.25) nonanoate(0.75) | 90.5 |
| POE12 | pentaerythritol 2-ethylhexanoate(0.24) nonanoate(0.76) | 93.9 |
| POE13 | pentaerythritol isooctanoate (0.18) 3,5,5-trimethylhexanoate(0.82) | 121.1 |
| POE14 | pentaerythritol hexanoate | 52.2 |
| POE15 | pentaerythritol valerate | 48.7 |
| POE16 | dipentaerythritol 3,5,5-trimethylhexanoate | 254.2 |

The values in the parentheses are molar fractions.

TABLE 4

| | Base Oil | Dissolved $CO_2$(%) | Two-layer Separating Temperature (° C.) | Oil Appearance | Catalyst Appearance | Total Acid Value | Sludge | Moisture Absorption (%) | Burning Load (Lbs) |
|---|---|---|---|---|---|---|---|---|---|
| Ex. 5 | POE5 | 27 | 18 | good | good | 0.08 | no | 0.18 | 750 |
| Ex. 6 | POE6 | 23 | 17 | good | good | 0.06 | no | 0.16 | 800 |
| Ex. 7 | POE7 | 26 | 18 | good | good | 0.07 | no | 0.12 | 770 |
| Ex. 8 | POE8 | 25 | 19 | good | good | 0.07 | no | 0.13 | 780 |
| Ex. 9 | POE9 | 24 | 17 | good | good | 0.05 | no | 0.12 | 810 |
| Ex. 10 | POE10 | 25 | 21 | good | good | 0.08 | no | 0.14 | 790 |
| Ex. 11 | POE11 | 27 | 20 | good | good | 0.06 | no | 0.15 | 800 |
| Ex. 12 | POE12 | 28 | 18 | good | good | 0.06 | no | 0.12 | 790 |
| Ex. 13 | POE13 | 22 | 16 | good | good | 0.07 | no | 0.13 | 840 |
| Comp. Ex. 3 | POE14 | 30 | | dissolved | pale brown | partly yellowed | 0.87 | yes, a little | 0.25 | 610 |
| Comp. Ex. 4 | POE15 | 32 | | dissolved | brown | yellowed | 1.24 | yes, a little | 0.22 | 570 |
| Comp. Ex. 5 | POE16 | 15 | −1 | pale yellow | good | 0.21 | no | 0.11 | — |

TABLE 5

| | Refrigeration Cycle | Base Oil | Condition |
|---|---|---|---|
| Example 14 | A | POE1 | No trouble. |
| Example 15 | A | POE2 | No trouble. |
| Example 16 | A | POE3 | No trouble. |
| Example 17 | A | POE4 | A little sludge formed. |
| Comparative Example 6 | A | MO | Capillary tube clogged. Machine stopped in 2 months. |
| Comparative Example 7 | A | AB | Burnt. |

TABLE 5-continued

| | Refrigeration Cycle | Base Oil | Condition |
|---|---|---|---|
| Comparative Example 8 | A | POE1* | Much sludge formed. |

*No additive.

TABLE 6

| | Refrigeration Cycle | Base Oil | Condition |
|---|---|---|---|
| Example 18 | A | POE5 | No trouble. |
| Example 19 | A | POE6 | No trouble. |
| Example 20 | A | POE7 | No trouble. |
| Example 21 | A | POE8 | No trouble. |
| Example 22 | A | POE9 | No trouble. |
| Comparative Example 9 | A | POE14 | Burnt. |
| Comparative Example 10 | A | POE15 | Burnt. |
| Comparative Example 11 | A | POE16 | Capillary tube clogged. Machine stopped in 4 months. |

According to the invention, there are provided a refrigerator oil composition having good lubricity and sealability and capable of being stably used for a long period of time in a compression refrigeration cycle in which is used a refrigerant comprising $CO_2$ as the essential component, and also a lubrication method of using the composition.

What is claimed is:

1. A refrigerator oil composition comprising a refrigerant that comprises carbon dioxide ($CO_2$) as the essential component, and an ester-based lubricating oil composition; wherein the ratio of refrigerant/lubricating oil composition falls between 99/1 and 10/90 by weight, and wherein the ester-based lubricating oil composition comprises a base oil that comprises an ester oil as the essential component, and wherein when the refrigerator oil composition has a refrigerant content of 90% and an oil content of 10%, the refrigeration oil composition has a two-layer separating temperature of the higher temperature component, in which the refrigerator oil composition separates into two layers, of not lower than 5° C.

2. The refrigerator oil composition as claimed in claim 1, wherein the ester-based lubricating oil composition comprises a base oil that comprises an ester oil as the essential component and has a kinematic viscosity at 100° C. of from 5.5 to 30 mm$^2$/sec, and from 0.005 to 5% by weight, relative to the base oil, of at least one selected from extreme pressure agents and acid scavengers.

3. A method of using the refrigerator oil composition of claim 2 in a compression refrigeration cycle equipped with at least one selected from oil separators and hot gas lines.

4. A method of lubricating a compression refrigeration cycle equipped with at least one selected from oil separators and hot gas lines, for which is used the refrigerator oil composition of claim 2.

5. The refrigerator oil composition as claimed in claim 1, wherein the ester-based lubricating oil composition comprises a base oil that comprises an ester oil as the essential component and has a kinematic viscosity at 40° C. of from 56 to 130 mm$^2$/sec, and wherein the ester oil is of an ester compound of pentaerythritol with at least one selected from C8 and C9 fatty acids.

6. The refrigerator oil composition as claimed in claim 5, wherein the ester oil is of a carbonate compound.

7. A method of using the refrigerator oil composition of claim 5 in a compression refrigeration cycle equipped with at least one selected from oil separators and hot gas lines.

8. A method of lubricating a compression refrigeration cycle equipped with at least one selected from oil separators and hot gas lines, for which is used the refrigerator oil composition of claim 5.

9. The refrigerator oil composition as claimed in claim 5, wherein the fatty acids are in the form of a mixed acid of a branched C8 fatty acid and a branched C9 fatty acid.

10. A method of using the refrigerator oil composition of claim 9 in a compression refrigeration cycle equipped with at least one selected from oil separators and hot gas lines.

11. A method of lubricating a compression refrigeration cycle equipped with at least one selected from oil separators and hot gas lines, for which is used the refrigerator oil composition of claim 9.

12. The refrigerator oil composition as claimed in claim 1, wherein the two-layer separating temperature is not lower than 15° C.

13. The refrigerator oil composition as claimed in claim 1, wherein the two-layer separating temperature is from 5° C. to 21° C.

* * * * *